United States Patent [19]
Damratowski

[11] 3,855,788
[45] Dec. 24, 1974

[54] APPARATUS FOR AND A METHOD OF OPERATING POWER RECOVERY EQUIPMENT

[75] Inventor: Leonard P. Damratowski, Monroeville, Pa.

[73] Assignee: Carrier Corporation, Syracuse, N.Y.

[22] Filed: Sept. 27, 1973

[21] Appl. No.: 401,490

Related U.S. Application Data

[60] Continuation of Ser. No. 255,421, May 22, 1972, abandoned, which is a division of Ser. No. 110,987, Jan. 29, 1971, Pat. No. 3,777,486.

[52] U.S. Cl. ................. 60/39.03, 60/39.25, 60/105
[51] Int. Cl. ............................................. F02c 9/02
[58] Field of Search ........ 60/39.03, 39.25, 105, 108

[56] References Cited
UNITED STATES PATENTS

| | | | |
|---|---|---|---|
| 2,619,798 | 12/1952 | Strub | 60/39.25 X |
| 2,714,670 | 8/1955 | Linder | 60/39.03 X |
| 3,255,586 | 6/1966 | Hennig | 60/39.03 |
| 3,503,204 | 3/1970 | Suter | 60/39.25 X |

*Primary Examiner*—Clarence R. Gordon
*Attorney, Agent, or Firm*—J. Raymond Curtin

[57] ABSTRACT

Power recovery apparatus utilizing energy present in the flue gas of a catalyst regenerator of the kind employed in fractional distillation plants wherein the conduit connecting the regenerator and a power recovery turbine is provided with means for rapidly venting the section of a main supply conduit immediately upstream of the turbine to rapidly decrease power recovery turbine output.

1 Claim, 1 Drawing Figure

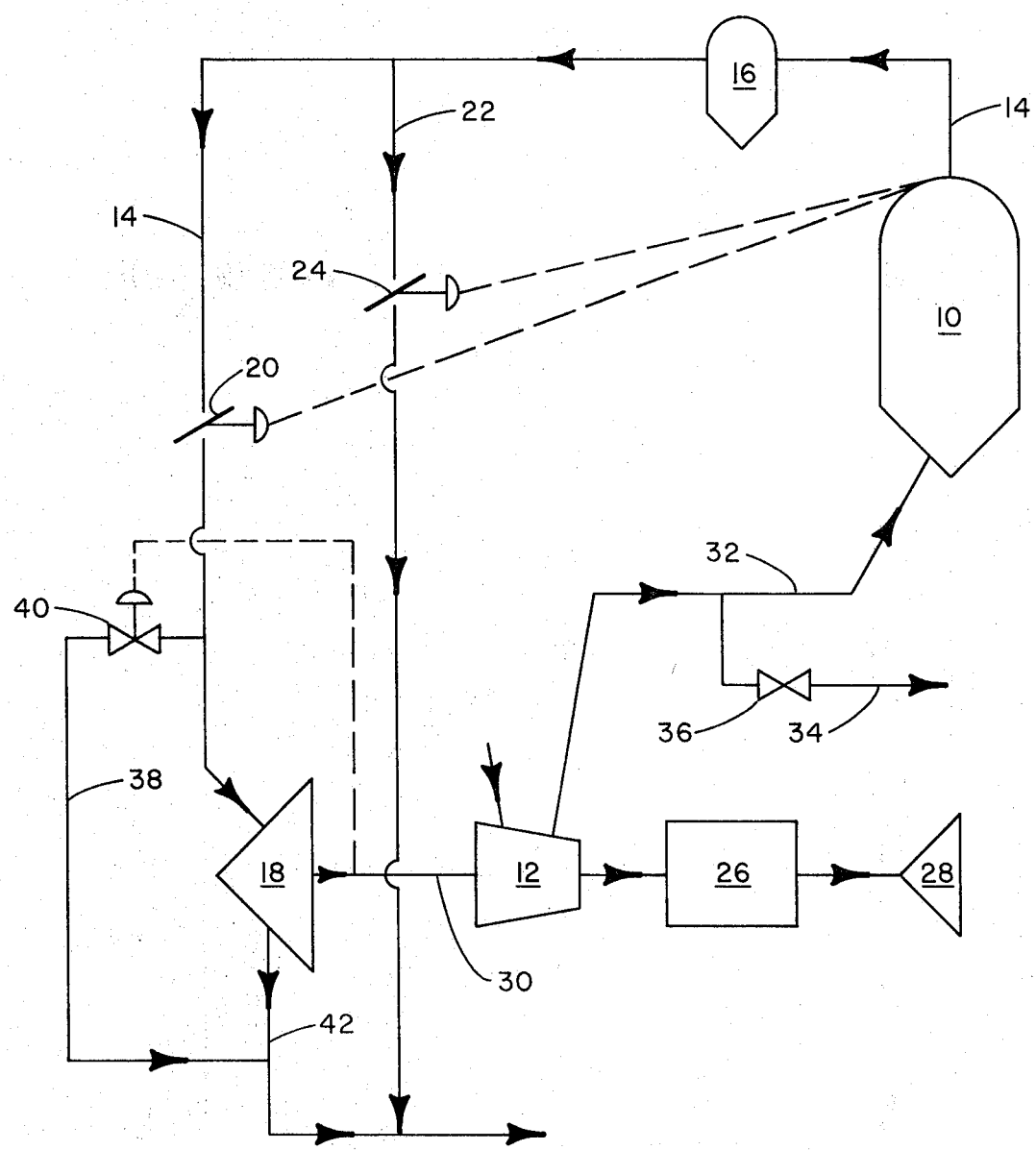

APPARATUS FOR AND A METHOD OF OPERATING POWER RECOVERY EQUIPMENT

This is a continuation, of application Ser. No. 255,421 filed May 22, 1972, now abandoned, which in turn is a division of Ser. No. 110,987, filed Jan. 29, 1971, now U.S. Pat. No. 3,777,486.

BACKGROUND OF INVENTION

In the recovery of certain distillates from crude oil in fractionation apparatus commonly known as fluid catalytic cracking plants, it is common practice to introduce a catalyst into the reactor employed in the plant in the interest of more efficiently accomplishing the desired distillation. As a result of the introduction of the catalyst into the reactor, the material used as the catalyst acquires a coating of carbonaceous material as a deposit tightly adhering to the surface thereof.

It has been found economical to remove the surface deposit from the catalyst in a regenerator so that the catalyst may be re-introduced or re-cycled into the reactor to maintain a continuous distillation cycle or operation. The coating or surface deposit usually referred to as coke is removed by subjecting the coated catalyst to air in a high temperature atmosphere within a regenerator in the form of a pressure vessel. The high temperature atmosphere comprises high pressure air serving as a fluidizing medium and a source of oxygen for combustion of accumulated surface deposits (coke) on the catalyst. This process is referred to as "burning off" the surface accumulation or coke from the catalyst.

Once the carbonaceous material has been removed from the surface of the catalyst, the catalyst is removed from the regenerator and re-introduced with oil into the reactor where the distillation process of the crude oil continuously occurs. The hot products of combustion created in the regenerator vessel and containing entrained catalyst particles are withdrawn from the vessel by venting them to the atmosphere through appropriate disposal devices such as a scrubber or the like for removing air contaminents or for recovering energy from the gas flow.

It has been proposed that the energy available in the gaseous products of combustion be more usefully employed, and for this purpose, a turbine referred to as a power recovery turbine is arranged to receive the gaseous products of combustion from the regenerator vessel as input fluid after removal of the greater part of the entrained catalyst particles. When the power recovery turbine is employed in the fluid catalytic cracking cycle, it represents the prime flow control or pressure drop in the system. The power recovery turbine is mechanically connected to an air compressor for supplying the air requirement of the regenerator vessel and/or to other driven machinery such as an electric generator. The machines are connected in axial alignment so that the power shaft of each serves as an extension of the other. The arrangement is commonly referred to as a "string."

Certain problems are encountered, however, in equating the power recovery turbine horsepower represented by the gas state conditions from the regenerator and the horsepower requirements of the machine or machines representing power recovery system load. The problems arise in part because the distillation process is subject to upsets which result in variations in temperature, air flow and pressure which variations in turn affect gas flow and state conditions ahead of the power recovery turbine.

Due to the relatively large volumes of gases created in the regenerator vessel, it is necessary to use relatively large valves in the relatively large conduits on the order of four to seven feet in diameter leading from the vessel. Large valves are relatively slow in responding to manual or automatic signals which call for repositioning of the valve due to flow, pressure and/or temperature changes occurring in the vessel. Thus, undesirable operating conditions may occur before appropriate adjustment of flow control valves can be made and may continue for a period such that operation of the mechanical equipment would be terminated because of shaft overspeed. Power recovery turbines of the kind under consideration usually are provided with overspeed controls that provide a signal to terminate operation of the turbine when a particular shaft speed is exceeded. With the arrangement described, compressed air flow to the regenerator vessel would terminate causing the catalyst regenerator to cease operation. With the catalyst regenerator disabled, the entire process would have to be terminated, causing expensive costs to be incurred until operation is resumed. Another type of upset in addition to those mentioned which will adversely affect the speed of the power recovery turbine drive shaft is encountered when an electric generator is a driven machine. When the generator is short circuited or encounters another form of load loss, the power recovery turbine shaft speed increases to a dangerous level and could conceivably overspeed causing the entire string to terminate operation.

SUMMARY OF THE INVENTION

This invention involves provision of a control system for a power recovery turbine arranged to receive gas from a vessel as its source of energy. The control system is operable to automatically adjust gas flow rates so that the volume of gas flow presented to the turbine inlet is regulated relative to the load or an indication of load such as shaft speed on the power recovery turbine despite upsets or loss of generator load.

Briefly, the control system includes a main gas flow conduit connecting the inlet of the turbine with the vessel, and a parallel conduit serving as a by-pass line or shunt for the turbine, the latter conduit being connected to a boiler or suitable atmospheric exhaust device. Relatively large valves are provided in each relatively large line together with actuating mechanism for operating the valves so that flow is restricted to the two conduits, the foregoing being common practice in the art. In addition, a separate conduit is connected to the main gas flow conduit downstream of the valve associated with main gas conduit. This latter conduit is of relatively small diameter (on the order of 1 to 1½ feet) compared to the first two conduits and includes a relatively small but fast-acting valve regulating flow therein.

The separate smaller conduit provides a second or fast-acting shunt around the turbine and likewise terminates in a boiler or suitable atmospheric exhaust device. The purpose of the second shunt is to provide a relatively rapid venting action for the gas present in the main conduit downstream of the control valve in the main conduit. Actuating mechanism for the valve in the second shunt conduit responds to a condition indicative of an approaching shaft overspeed problem. For example, the actuating mechanism may respond directly to turbine shaft speed or to any other characteristic of the power recovery system that affects its safety and operation.

BRIEF DESCRIPTION OF THE DRAWING

The FIGURE is a schematic representation of a power recovery system equipped with a control arrangement illustrating the invention.

DESCRIPTION OF A PREFERRED EMBODIMENT OF THE INVENTION

Referring more particularly to the drawing, there is shown a regenerator vessel 10 of the kind used to reconstitute catalyst used in the fractionation of crude oil. It will be appreciated that a line for directing catalyst having a coating of carbonaceous material adhering to the surface thereof from a reactor to the vessel and a line for directing clean catalyst or catalyst from which the coating has been removed to the reactor provide for the continuous flow of catalyst to and from the reactor. The rate of catalyst flow depends to a great extent on the circumstances surrounding the chemical reaction occurring in the reactor.

Removal of the carbonaceous coating referred to as coke is accomplished by burning in an atmosphere of high temperature air under high pressure. The air supplied to the vessel 10 originates as atmospheric air flowing to the inlet of an air compressor 12. The air is compressed by compressor 12 and fed to the vessel 10 where it provides oxygen for burning the carbonaceous material from the catalyst to cause physical separation of the coating of coke from the particles of the catalyst.

The products of combustion or flue gas formed as a result of the removal of the coating from the catalyst particles flow from the vessel through a main conduit 14. In order to separate any particulate material from the products of combustion emanating from the vessel 10, a separator 16 which may be of the well known cyclone type design is provided in main conduit 14. Substantially particle-free gas flows from the separator 16 to the inlet of turbine 18 with the flow being regulated by valve 20, a relatively slow acting valve responsive to a condition of the gas, such as pressure, within the vessel The term "slow acting" as used herein means the time interval required for the valve to move from either of its extreme positions to the other which can be on the order of 45 seconds.

Connected in parallel with main conduit 14 is a by-pass conduit 22 equipped with a valve 24 similar to the valve 20 in main conduit 14. By-pass conduit 22 provides a path for the flow of gas directly to either a boiler or other facility not shown when desired.

Mechanically connected to the power recovery turbine is air compressor 12, generator 26 for providing electric current for use with accessories, not shown, and a starting steam turbine 28. The mechanical energy developed by the power recovery turbine is used to satisfy the individual horsepower requirements of compressor 12 and generator 26. Preferably, the control system should operate to automatically adjust the input to the power recovery turbine to balance the power recovery system requirement represented by the total of the air compressor requirement and the electric generator requirement. It will be obvious that if gas state conditions to the power recovery turbine provide an input resulting in a turbine output in excess of the needs of the compressor 12 and the design limits of generator 26, or if the generator suddenly loses load, the speed of the turbine shaft will increase. Should the speed of shaft 30 continue to increase, the entire string of equipment could cease operation due to actuation of a conventional shaft overspeed tripping device. Such an occurrence would ultimately involve shutting down the regenerator and the reactor served by the regenerator, and any downstream process involved.

Assuming the turbine exhaust pressure to be constant, the flow of gas to the power recovery turbine 18 from the regenerator vessel 10 is determined in accordance with the formula:

$$P_1 C / \sqrt{RT} = G_T$$

Where
 $G_T$ = mass flow in pounds per time interval
 $C$ = power recovery turbine flow coefficient
 $R$ = molar gas constant — ft. lbs./lb.
 $T$ = temperature degree Rankine (turbine inlet)
 $P_1$ = power recovery turbine inlet pressure With the relationship shown above, the flow presented to the turbine will vary in accordance with a variation in temperature, a variation in pressure within the vessel and/or a variation in gas constant. A variation in temperature may occur due to a process upset brought about by one of several possibilities such as change in air flow, air pressure and molecular weight requirements.

In addition to the equation pertaining to the determination of gas flow, it is necessary to consider the equation for determining the horsepower developed by a turbine in order to appreciate the control system forming the subject of this invention. The equation for determining horsepower is:

$$\text{Horsepower}_T = G_T c_p T_1 \frac{\left[ \rho^{\frac{k-1}{k}} - 1 \right]}{\rho^{\frac{k-1}{k}}} n_t A$$

Where
 $G_T$ = gas flow in pounds per time interval
 $c_p$ = specific heat of the gas at constant pressure
 $T_1$ = inlet temperature degree Rankine
 $\rho$ = pressure$_{inlet}$/pressure$_{discharge}$
 $k$ = ratio of specific heats = $c_p/c_v$
 $n_t$ = turbine efficiency
 $A$ = constant Once the power recovery turbine shaft speed increases, it is an indication the turbine is producing excessive horsepower. The control system here proposed operates to automatically reduce the horsepower developed by the power recovery turbine by adjusting flow to the turbine. If a portion of the flow to the turbine directly upstream thereof is diverted, the velocity of the gas in that part of the power recovery cycle illustrated by conduit 14, valve 20 and the inlet to the turbine will increase. Because of the size of the regenerator vessel the pressure of the gas in the vessel remains nearly the same. The pressure at the entrance to the turbine drops as the velocity of the gas increases through conduit 14, valve 20 and the separator 16. This in turn reduces the pressure drop across the turbine. Referring to the equation for determining turbine horsepower, it will be observed that the reduction in flow reduces the term "$G_T$" and the reduction in pressure drop reduces the fractional term in the second part of the equation. Thus, the horsepower developed by the turbine is effectively reduced.

A control system which relies on valve 20 to accomplish the desired reduction in flow at the turbine inlet is ineffective for the reason that the relatively slow response of valve 20 prevents the timely reduction and the turbine continues to increase its shaft speed until the overspeed trip signals to terminate the operation of the turbine. To solve this problem, a line 38 having a relatively small diameter on the order of 1 foot to 1½ feet communicates with main conduit 14 between the turbine inlet and the valve 20 and a boiler or other suitable exhaust device. A relatively fast-acting valve 40, responsive to shaft speed controls flow in line 38. The control for valve 40 is a signal responsive to shaft speed somewhat less than the speed at which the overspeed trip signals to terminate operation of the turbine. With this arrangement, line 38 serves to vent a portion of the flow to establish the desired gas flow at the turbine inlet.

The term "gas state conditions" as used hereinabove, as is well known to those skilled in the art, means temperature, pressure and molecular weight of the gas.

While the invention has been described in connection with utilizing a shaft speed signal to actuate valve 40, it will be obvious other suitable criteria could be employed for this purpose.

I claim:
1. The method of regulating the operation of a power recovery turbine utilizing as a source of energy substantially particle-free gaseous products of combustion formed in a catalyst regenerator serving a fluid catalytic cracking plant which comprises the steps of:
   a. directing the flow of gaseous products of combustion from the regenerator to the inlet of the turbine through a main conduit having a relatively large diameter to accommodate the volume of gaseous flow emanating from the regenerator,
   b. providing a path of flow through a first by-pass conduit arranged in parallel with a portion of the main conduit whereby a variable volume of gaseous flow may be directed around the turbine,
   c. varying passage of gaseous products in the two conduits through actuation of flow control valves disposed therein,
   d. providing a path of flow through a second by-pass conduit communicating with the main conduit between the valve regulating flow therein and the inlet of the turbine to also direct gas around the turbine, and
   e. regulating the flow of gas in the by-pass conduits, and varying the regulating of the gas flow in the by-pass conduits such that flow in said second by-pass conduit may occur more rapidly than flow in said first by-pass conduit.

* * * * *